(12) United States Patent
Shigeta et al.

(10) Patent No.: US 7,553,257 B2
(45) Date of Patent: Jun. 30, 2009

(54) DRIVE FORCE DISTRIBUTION DEVICE AND METHOD FOR DISTRIBUTING DRIVE FORCE

(75) Inventors: Ryouhei Shigeta, Anjo (JP); Tomoaki Kato, Kariya (JP); Akihiro Ohno, Okazaki (JP); Tsuyoshi Murakami, Handa (JP); Tadashi Yoshioka, Chiryu (JP); Shunzo Tanaka, Nagoya (JP)

(73) Assignees: Jtekt Corporation, Osaka-shi (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 410 days.

(21) Appl. No.: 11/496,515

(22) Filed: Aug. 1, 2006

(65) Prior Publication Data
US 2007/0032339 A1   Feb. 8, 2007

(30) Foreign Application Priority Data
Aug. 2, 2005   (JP)   ............................. 2005-224299

(51) Int. Cl.
*F16H 59/64* (2006.01)
*B60W 10/02* (2006.01)
*G06F 7/00* (2006.01)

(52) U.S. Cl. ............................. 477/98; 477/174; 701/65

(58) Field of Classification Search .................. 477/98, 477/76, 177; 701/60, 65; 180/247, 248
See application file for complete search history.

(56) References Cited

U.S. PATENT DOCUMENTS

| | | | |
|---|---|---|---|
| 4,774,910 A | | 10/1988 | Aihara et al. |
| 5,681,237 A | * | 10/1997 | Furukawa et al. ............. 477/98 |
| 5,707,315 A | * | 1/1998 | Furukawa et al. ............. 477/98 |
| 5,884,609 A | | 3/1999 | Kawamoto et al. |
| 6,086,248 A | | 7/2000 | Paul et al. |
| 6,618,666 B2 | | 9/2003 | Amano et al. |
| 6,637,565 B2 | * | 10/2003 | Kwon ........................ 192/3.29 |

(Continued)

FOREIGN PATENT DOCUMENTS

EP   1 270 305 A2   1/2003

(Continued)

OTHER PUBLICATIONS

U.S. Appl. No. 11/496,513, filed Aug. 1, 2006, Shigeta et al.

(Continued)

*Primary Examiner*—Roger Pang
(74) *Attorney, Agent, or Firm*—Oblon, Spivak, McClelland, Maier & Neustadt, P.C.

(57) ABSTRACT

An ECU estimates the temperatures of the heat generating portions provided in a drive force transmission system, or a transaxle, a rear differential, and a torque coupling, in correspondence with not only the rotational speed (the differential rotational speed) of each heat generating portion and the torque transmission rate of the torque coupling but also the outside temperature detected by an outside temperature sensor. If the estimated temperature of any of the heat generating portions exceeds a respective predetermined temperature, the ECU controls operation of the torque coupling to suppress overheating of the heat generating portion. That is, the temperature of each heat generating portion is accurately detected through a simplified structure and overheating of the heat generating portion is effectively suppressed.

10 Claims, 3 Drawing Sheets

U.S. PATENT DOCUMENTS

| | | |
|---|---|---|
| 6,655,135 B2 | 12/2003 | Oka |
| 6,752,742 B2 | 6/2004 | Shigeta et al. |
| 6,769,526 B2 * | 8/2004 | Iida et al. ............... 192/82 T |
| 6,980,904 B2 | 12/2005 | Gosho et al. |
| 7,048,084 B2 | 5/2006 | Shigeta et al. |
| 7,077,783 B2 * | 7/2006 | Senger et al. .............. 477/98 |
| 7,105,936 B2 | 9/2006 | Kubo |
| 7,329,206 B2 * | 2/2008 | Tanaka .................. 477/176 |
| 2003/0079954 A1 * | 5/2003 | Murakami et al. ......... 192/82 T |
| 2005/0029035 A1 * | 2/2005 | Shigeta et al. ............ 180/248 |
| 2007/0032339 A1 | 2/2007 | Shigeta et al. |

FOREIGN PATENT DOCUMENTS

| | | |
|---|---|---|
| EP | 1 308 338 A2 | 5/2003 |
| JP | 7-12155 | 1/1995 |
| JP | 2003-136990 | 5/2003 |
| WO | WO 02/25133 A1 | 3/2002 |

OTHER PUBLICATIONS

U.S. Appl. No. 11/496,515, filed Aug. 1, 2006, Shigeta et al.

* cited by examiner

DRIVE FORCE DISTRIBUTION DEVICE AND METHOD FOR DISTRIBUTING DRIVE FORCE

CROSS-REFERENCE TO RELATED APPLICATIONS

This application is based upon and claims the benefit of priority from prior Japanese Patent Application No. 2005-224299, filed on Aug. 2, 2005, the entire contents of which are incorporated herein by reference.

BACKGROUND OF THE INVENTION

The present invention relates to a drive force distribution device and a method for distributing drive force.

A typical drive force distribution device is capable of changing a drive force distribution ratio of a main drive wheel to a sub drive wheel. Typically, a torque coupling is provided in a drive force transmission system. Operation of the torque coupling is controlled in such a manner as to change the torque transmission rate (the transmitted torque) from an input to an outlet of the torque coupling. This regulates the drive force distribution ratio of the main drive wheel to the sub drive wheel.

The torque coupling employs a friction clutch, which generates heat through frictional engagement of clutch plates. Also, a transfer case or a differential, which are arranged in the drive force transmission system of a vehicle, generate heat through friction caused by engagement of gears. Overheating of these heat generating portions thus must be suppressed.

For example, Japanese Laid-Open Patent Publication No. 2003-136990 describes a drive force distribution device that detects the temperatures of a differential or a transfer case provided in a drive force transmission system. If the temperature of the differential or the transfer case exceeds a corresponding predetermined level, the drive force distribution device controls operation of a torque coupling in such a manner as to suppress overheating of the differential or the transfer case.

Alternatively, Japanese Laid-Open Patent Publication No. 7-12155 describes a method for estimating the temperature of a torque coupling in correspondence with the rotational speeds (difference of the rotational speeds) of an input shaft and an output shaft provided in the torque coupling, torque transmitted by the torque coupling, and the temperature of hydraulic fluid supplied to the torque coupling.

However, to provide temperature sensors in each of the heat generating portions, an increased cost is needed to prepare, assemble, and wire the parts. Further, to estimate the temperature of each heat generating portion based on the temperature of the hydraulic fluid supplied to the heat generating portion, the vehicle must have fluid temperature sensors that can detect the fluid temperatures in the heat generating portions.

SUMMARY OF THE INVENTION

Accordingly, it is an objective of the present invention to provide a drive force distribution device and a method for distributing drive force that suppress overheating of the heat generating portion.

To achieve the foregoing and other objectives and in accordance with one aspect of the present invention, a drive force distribution device of a vehicle including a main drive wheel, a sub drive wheel, and a drive force transmission system that transmits a drive force generated by a drive source to the drive wheels is provided. The device includes a coupling and a control section. The coupling is arranged in the drive force transmission system. The coupling changes a torque transmission rate of a torque transmitted from an input of the coupling to an output of the coupling, thereby varying a drive force distribution ratio between the main drive wheel and the sub drive wheel. The control section controls operation of the coupling. The control section estimates a temperature of at least one of heat generating portions of the drive force transmission system in correspondence with a rotational speed of the heat generating portion, the torque transmission rate, and an outside temperature. If the estimated temperature exceeds a predetermined temperature, the control section controls the operation of the coupling to suppress overheating of the heat generating portion.

In accordance with a second aspect of the present invention, a method for distributing drive force of a vehicle including a main drive wheel, a sub drive wheel, and a drive force transmission system that transmits a drive force generated by a drive source to the drive wheels is provided. The method includes: controlling operation of a coupling arranged in the drive force transmission system to vary a drive force distribution ratio between the main drive wheel and the sub drive wheel by changing a torque transmission rate of a torque transmitted from an input of the coupling to an output of the coupling; estimating a temperature of at least one of heat generating portions of the drive force transmission system in correspondence with the rotational speed of the heat generating portion, the torque transmission rate, and an outside temperature; determining whether the estimated temperature of at least one of the heat generating portions exceeds a corresponding predetermined temperature; and controlling the operation of the coupling to suppress overheating of the corresponding heat generating portion if the estimated temperature exceeds the predetermined temperature.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to the attached drawings.

Figure 1:
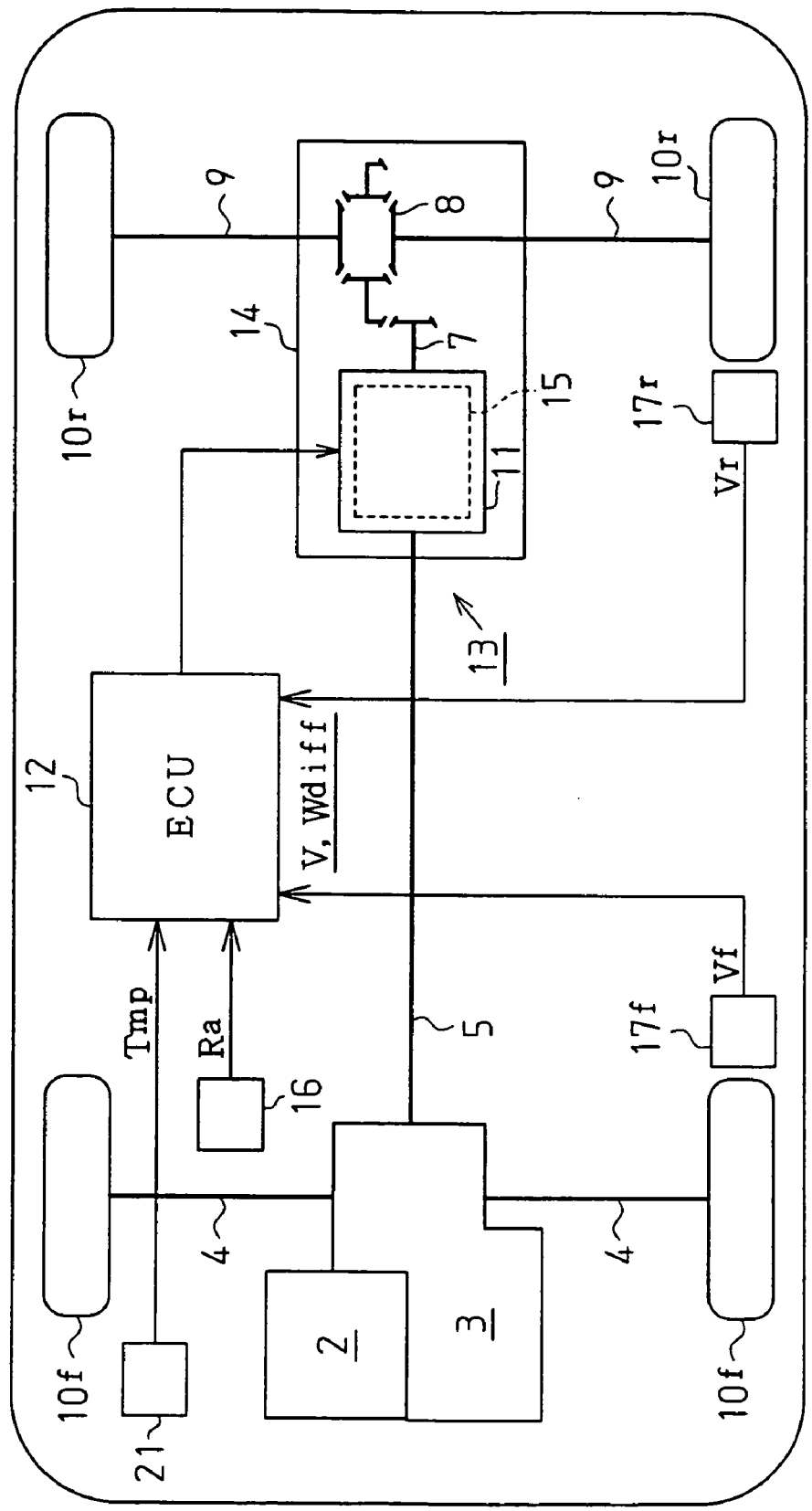
FIG. 1 is a diagram schematically showing the structure of a vehicle having a drive force distribution device according to one embodiment of the present invention.

As illustrated in FIG. 1, a vehicle 1 is a front-wheel-drive based four-wheel-drive vehicle. The present invention is embodied as a drive force distribution device of a four-wheel-drive vehicle. A transaxle 3 is provided in an engine 2. A pair of front axles 4 and a propeller shaft 5 are connected to the transaxle 3. The propeller shaft 5 is also connected to a drive pinion shaft 7. The pinion shaft 7 is connected to a pair of rear axles 9 through a rear differential 8, or a differential. In other words, the drive force generated by the engine 2 is transmitted sequentially to the transaxle 3 and the front axle 4 in this order and then reaches front wheels 10f. Meanwhile, the drive force of the engine 2 is transmitted sequentially to the transaxle 3, the propeller shaft 5, the pinion shaft 7, the rear differential 8, and the rear axle 9 in this order and thus received by rear wheels 10r.

In the illustrated embodiment, the vehicle 1 includes a torque coupling 11 and an ECU 12. The torque coupling 11 is arranged in the above-described drive force transmission system. The torque coupling 11 changes the rate of the torque transmitted from the input to the outlet of the torque coupling 11 (the torque transmission rate). This alters the drive force distribution ratio of the front wheels 10f, which are main drive wheels, to the rear wheels 10r, or sub drive wheels. The ECU 12 functions as a control section that controls operation of the torque coupling 11. In the illustrated embodiment, the torque coupling 11 and the ECU 12 form a drive force distribution device 13.

Specifically, the torque coupling 11 of the illustrated embodiment is arranged between the propeller shaft 5 and the pinion shaft 7. That is, the rear differential 8, or the differential, is provided between the torque coupling 11 and the rear wheels 10r, the sub drive wheels. The transaxle 3 includes a transfer case portion, which is arranged between the engine 2, or a drive source, and the torque coupling 11. The torque coupling 11, the pinion shaft 7, and the rear differential 8 are accommodated in a differential carrier 14.

In the present embodiment, the torque coupling 11 has an electromagnetic clutch 15. The electromagnetic clutch 15 has a pair of clutch plates, or an input clutch plate and an output clutch plate, and an electromagnetic coil. The input clutch plate is connected to the propeller shaft 5 and the output clutch plate is connected to the pinion shaft 7. The force generated by friction engagement between the clutch plates changes in correspondence with the amount of the current supplied to the electromagnetic coil. The torque is caused in correspondence with the friction engagement force of the clutch plates. The electromagnetic clutch 15 transmits the torque from the input clutch plate to the outlet clutch plate. By adjusting the amount of the current supplied to the electromagnetic clutch 15, the ECU 12 controls operation of the torque coupling 11, or regulates the torque transmission rate. In this manner, the ECU 12 adjusts the drive force distribution ratio of the front wheels 10f, or the main drive wheels, to the rear wheels 10r, or the sub drive wheels.

More specifically, in the illustrated embodiment, a throttle opening degree sensor 16 and wheel speed sensors 17f, 17r are connected to the ECU 12. In correspondence with signals provided by these sensors, the ECU 12 detects a throttle opening degree Ra, a vehicle speed V, and a wheel speed difference Wdiff, which is a difference between the wheel speed of each front wheel 10f and the wheel speed of each rear wheel 10r. The drive force distribution ratio is determined in correspondence with the detection results. The ECU 12 controls operation of the torque coupling 11 in such a manner as to adjust the torque transmission rate to a value corresponding to the determined drive force distribution ratio.

(Suppression of Overheating)

Next, suppression of overheating by the drive force distribution device of the illustrated embodiment will be explained.

The transaxle 3, the rear differential 8, and the torque coupling 11 are each a heat generating portion of the drive force transmission system. The drive force distribution device 13 suppresses overheating of the heat generating portions. In advance, predetermined temperatures T1, T2, and T0 are set for the transaxle 3, the rear differential 8, and the torque coupling 11, respectively. If at least one of the temperature Ttf of the transaxle 3, the temperature Tdf of the rear differential 8, and the temperature Ttc of the torque coupling 11 exceeds the corresponding temperature T1, T2, T0, operation of the torque coupling 11 is controlled to suppress overheating of the corresponding heat generating portion.

Specifically, in the illustrated embodiment, the wheel speed sensors 17f, 17r and an outside temperature sensor 21 are connected to the ECU 12. In correspondence with the rotational speed (the differential rotational speed) of each of the heat generating portions, the torque transmission rate of the torque coupling 11, and the outside temperature Tmp detected by the outside temperature 21, the ECU 12 estimates the temperatures Ttf, Tdf, Ttc. The outside temperature sensor 21 is defined by a temperature sensor arranged in the vicinity of an outside air inlet for the air conditioning of the passenger compartment or an intake air temperature sensor installed in an intake pipe of the engine.

Figure 2:
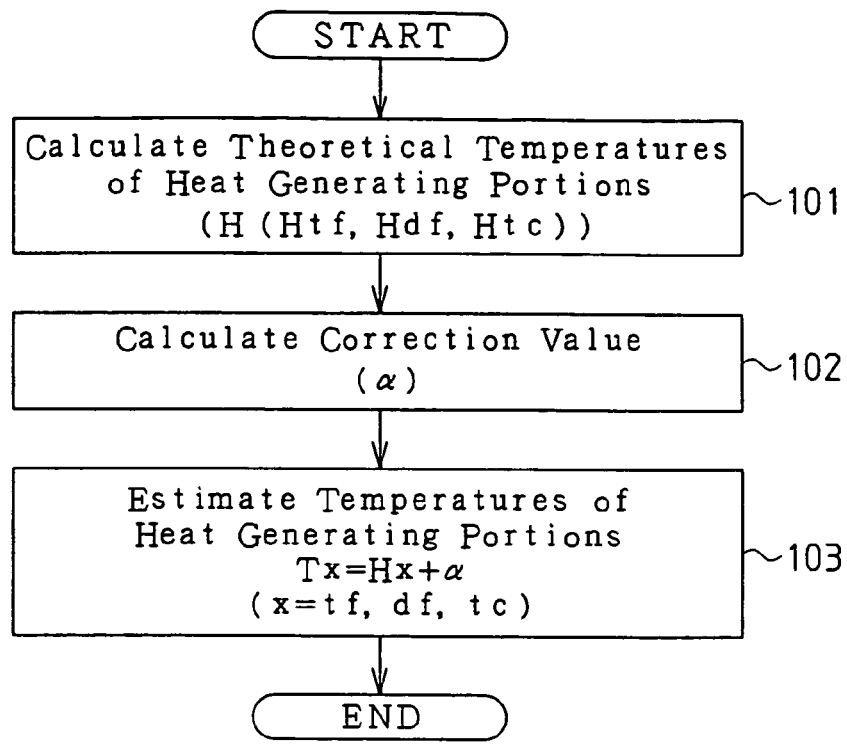
FIG. 2 is a flowchart representing a procedure for estimating temperatures of different heat generating portions of a drive force transmission system of the vehicle of FIG. 1.

More specifically, as indicated by the flowchart of FIG. 2, the ECU 12 calculates the theoretical temperature H of each heat generating portion using the following equation (1) at predetermined sampling intervals (in step 101).

$$H(n) = K1 \times \Sigma(K2 \times \text{Transmitted Torque} \times \text{Rotational Speed} - K3 \times H(n-1)) \quad (1)$$

In the equation (1), H(n−1) corresponds to a value obtained in a previous calculation cycle. K1, K2, and K3 are constants. By setting the constants K1, K2, K3 in correspondence with the heat generating portions, the theoretical temperatures H (Htf, Hdf, Htc) of the heat generating portions are obtained. The "rotational speed" is calculated from the front wheel speed Vf detected by the wheel speed sensor 17f and the rear wheel speed Vr detected by the wheel speed sensor 17r. The transaxle 3 is arranged between the engine 2, or the drive source, and the front wheels 10f, or the main drive wheels and between the engine 2 and the torque coupling 11. Thus, the rotational speed of the transaxle 3 is determined in correspondence with the front wheel speed Vf. Since the rear differential 8 is arranged between the torque coupling 11 and the rear wheels 10r, or the sub drive wheels, the rotational speed of the rear differential 8 is determined in correspondence with the rear wheel speed Vr. The rotational speed (the differential rotational speed) of the torque coupling 11 is obtained from the difference between the front wheel speed Vf and the rear wheel speed Vr.

Figure 3:
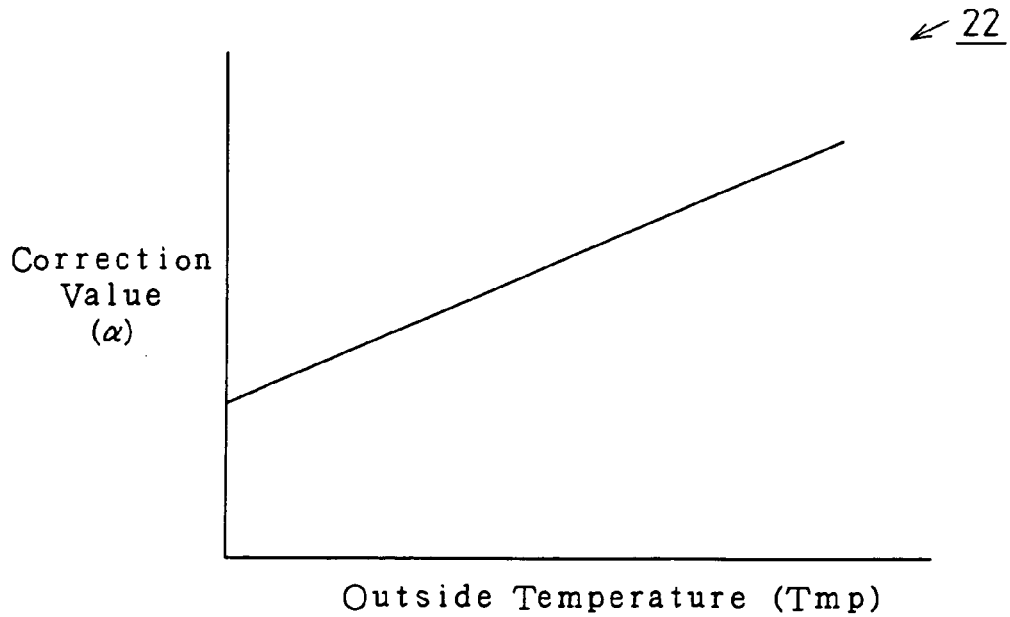
FIG. 3 is a map representing correction values associated with the outside temperature of the vehicle of FIG. 1.

Subsequently, in correspondence with a detection value of the outside temperature Tmp, the ECU 12 calculates a correction value α by which the theoretical temperatures H are corrected (in step 102). In the illustrated embodiment, the ECU 12 stores a map 22 in which the correction value α is set in association with the outside temperature Tmp (see FIG. 3). In accordance with the map 22, the correction value α increases as the outside temperature Tmp rises. The ECU 12 obtains the correction value α corresponding to the detection value of the outside temperature Tmp from the map 22.

Next, using the correction value α associated with the outside temperature Tmp, the ECU 12 corrects the theoretical temperatures H, which have been obtained from the equation (1) (Tx=Hx+α, x=tf, df, tc). In this manner, the temperatures Ttf, Tdf, Ttc of the heat generating portions are estimated (in step 103).

In other words, in the illustrated embodiment, the ECU 12 accumulates heat generating energy of each heat generating portion, which is calculated in correspondence with the rotational speed of the heat generating portion and the torque transmission rate. In this manner, heat energy accumulated in each heat generating portion, or the theoretical temperature H, is obtained. The ECU 12 then corrects the obtained value by canceling the influence (the cooling effect) by the outside temperature Tmp, thus estimating the temperatures Ttf, Tdf, Ttc of the heat generating portions.

A control procedure for suppressing overheating will hereafter be explained in detail.

Figure 4:
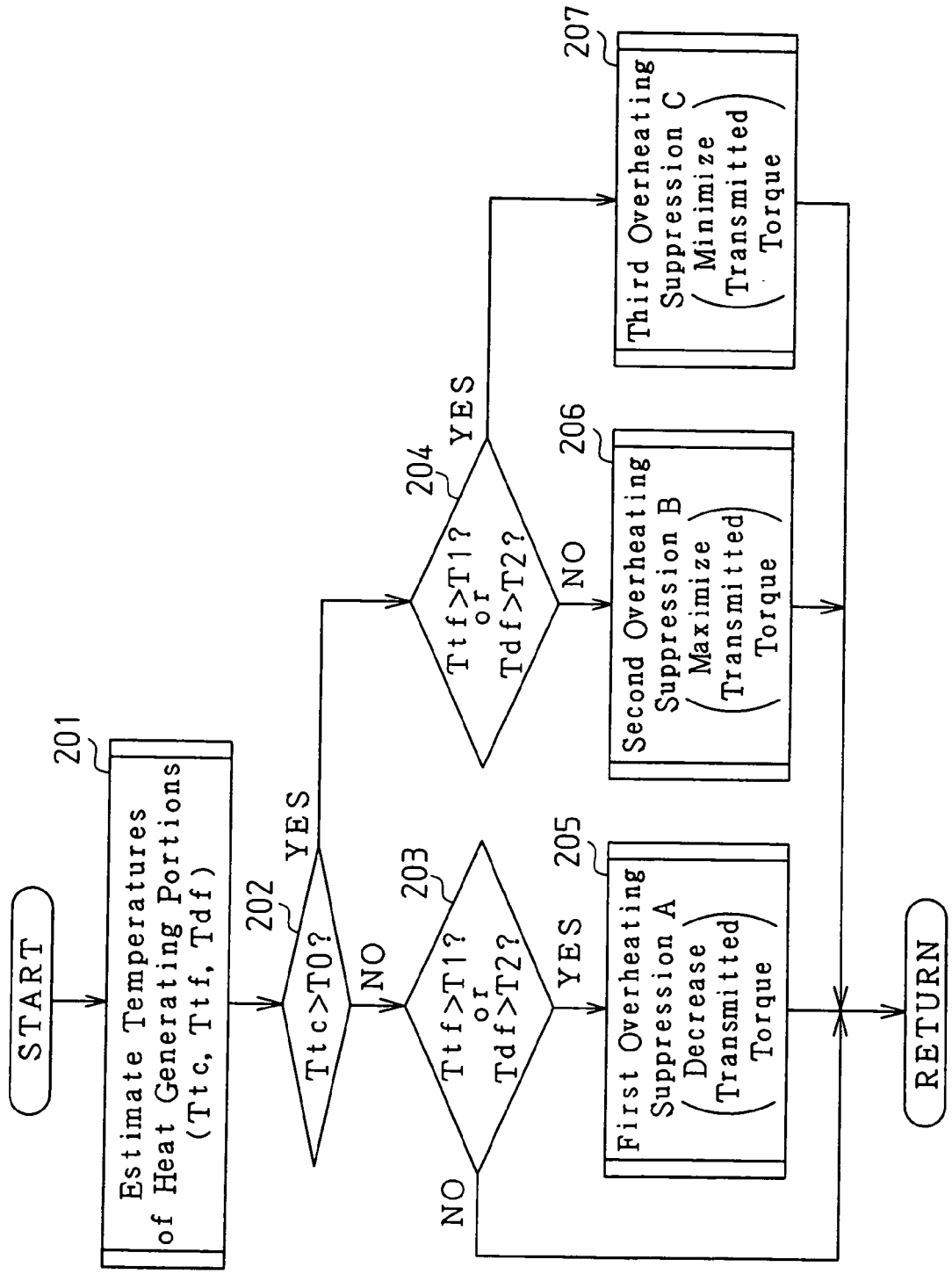
FIG. 4 is a flowchart representing a control procedure for suppressing overheating of the drive force transmission system of FIG. 1.

First, as indicated by the flowchart of FIG. 4, the ECU 12 estimates the temperatures Ttf, Tdf, Ttc of the heat generating portions (in step 201 of FIG. 4). The ECU 12 then determines whether the estimated temperature Ttc of the torque coupling 11 exceeds the predetermined temperature T0 for the torque coupling 11 (in step 202). Subsequently, the ECU 12 determines whether the temperature Ttf of the transaxle 3 or the temperature Tdf of the rear differential 8 exceeds the respective predetermined temperature T1, T2 (in step 203 or step 204).

If it is determined that the temperature Ttc of the torque coupling 11 is not more than the predetermined temperature T0 (Ttc≦T0, NO in step 202) and at least one of the temperature Ttf of the transaxle 3 and the temperature Tdf of the rear differential 8 exceeds the predetermined temperature T1, T2 (Ttf>T1 or Tdf>T2, YES in step 203), the ECU 12 controls operation of the torque coupling 11 to reduce the torque transmission rate (in step 205, first overheating suppression A).

Specifically, heat generation in the transaxle 3 and the rear differential 8 becomes significantly great when the drive force is distributed dominantly to the rear wheels 10*r*, or the sub drive wheels. Thus, by decreasing the torque transmission rate of the torque coupling 11 and reducing the load applied to the transaxle 3 and the rear differential 8, overheating of the transaxle 3 and the rear differential 8 can be suppressed. In the illustrated embodiment, the first overheating suppression A is performed by switching from a normal map by which the torque transmission rate, or the drive force distribution ratio of the front wheels 10*f* to the rear wheels 10*r*, is determined to an overheating suppression map that sets the torque transmission rate to lower values.

If it is determined that the temperature Ttc of the torque coupling 11 exceeds the predetermined temperature T0 in step 202 (Ttc>T0, YES in step 202), the ECU 12 controls the operation of the torque coupling 11 to decrease the differential rotational speed between the propeller shaft 5, which is connected to the input clutch plate, and the pinion shaft 7, which is connected to the outlet clutch plate, or reduce the torque transmission rate.

Specifically, overheating of the torque coupling 11 is caused by frication engagement of the electromagnetic clutch 15. The friction heat generated by the electromagnetic clutch 15 varies in proportion to the product of the differential rotational speed and the torque transmission rate. Thus, by decreasing at least one of the differential rotational speed and the torque transmission rate, the product of the differential rotational speed and the torque transmission rate is reduced to suppress the overheating of the torque coupling 11.

More specifically, if it is determined that the temperature Ttf of the transaxle 3 is not more than the predetermined temperature T1 and the temperature Tdf of the rear differential 8 is not more than the predetermined temperature T2 in step 204 (Ttf≦T1 and Tdf≦T2, NO in step 204), the ECU 12 controls the operation of the torque coupling 11 to maximize the torque transmission rate of the torque coupling 11 (in step 206, second overheating suppression B).

If it is determined that at least one of the temperature Ttf of the transaxle 3 and the temperature Tdf of the rear differential 8 exceeds the corresponding predetermined temperature T1, T2 in step 204 (Ttf>T1 or Tdf>T2, YES in step 204), the ECU 12 controls the operation of the torque coupling 11 to minimize the torque transmission rate of the torque coupling 11 (in step 207, third overheating suppression C).

Specifically, by maximizing the torque transmission rate, the torque coupling 11 is fully engaged and the differential rotational speed of the torque coupling 11 becomes substantially zero. This suppresses generation of friction heat and thus effectively prevents overheating of the torque coupling 11.

However, if the torque transmission rate of the torque coupling 11, or the drive force distributed to the rear wheels 10*r*, or the sub drive wheels, is maximized, the load acting on the transaxle 3 and the rear differential 8 increases. This may lead to overheating of the transaxle 3 and the rear differential 8. Therefore, in the illustrated embodiment, if the overheating of the transaxle 3 and the rear differential 8 becomes likely in addition to likeliness of the overheating of the torque coupling 11, the torque transmission rate of the torque coupling 11 is minimized. That is, the drive force distributed to the rear wheels 10*r* becomes substantially zero, thus disengaging the electromagnetic clutch 15. This suppresses heat generation by the electromagnetic clutch 15 and minimizes the load acting on the transaxle 3 and the rear differential 8. Accordingly, overheating of each of the heat generating portions is effectively suppressed.

The illustrated embodiment has the following advantages.

Estimation of the temperatures of the heat generating portions (the temperature Ttf of the transaxle 3, the temperature Tdf of the rear differential 8, and the temperature Ttc of the torque coupling 11) by the ECU 12 involves not only the rotational speed (the differential rotational speed) of each of the heat generating portion of the drive force transmission system and the torque transmission rate of the torque coupling 11 but also the outside temperature Tmp detected by the outside temperature sensor 21. If any of the estimated temperatures Ttf, Tdf, Ttc exceeds the respective predetermined temperature T1, T2, T0, the ECU 12 controls operation of the torque coupling 11 to suppress overheating of the heat generating portion(s).

This makes it unnecessary to install a temperature sensor or a fluid temperature sensor in each of the heat generating portions. The temperature of each heat generating portion is thus estimated through a simplified structure. Further, such estimation becomes further accurate compared to a case in which the temperature of each heat generating portion is estimated solely from the rotational speed of the heat generating portion and the torque transmission rate. Therefore, the procedure for suppressing overheating of the heat generating portions is performed further reliably. Overheating of each heat generating portion is thus effectively suppressed.

It should be apparent to those skilled in the art that the present invention may be embodied in many other specific forms without departing from the spirit or scope of the invention. Particularly, it should be understood that the invention may be embodied in the following forms.

In the illustrated embodiment, the present invention is embodied as the drive force distribution device 13 of the vehicle 1 in which the front wheels 10*f* are defined as the main drive wheels. However, the invention may be applied to a drive force distribution device of a vehicle in which the rear wheels 10*r* are defined as the main drive wheels. Alternatively, the invention may be applied to a four-wheel drive device including a center differential device combined with an ECU or a device for distributing torque between front and rear wheels and/or right and left wheels.

In the illustrated embodiment, the theoretical temperature H of each of the heat generating portions is obtained from the equation (1) based on the rotational speed (the differential rotational speed) of the heat generating portion and the torque transmission rate of the torque coupling 11. Then, the correction value α is determined in correspondence with the outside temperature Tmp. The theoretical temperature H of each heat generating portion is thus corrected with the correction value α. In this manner, the temperatures Ttf, Tdf, Ttc of the heat generating portions are obtained. However, the temperatures Ttf, Tdf, Ttc of the heat generating portions may be estimated using an equation that includes the detected outside temperature Tmp as a parameter.

In the illustrated embodiment, the transaxle 3, the rear differential 8, and the torque coupling 11 correspond to the heat generating portions of the drive force transmission system. However, only at least one of the transaxle 3, the rear differential 8, and the torque coupling 11 may be defined as a heat generating portion, which is a target of suppression of overheating.

Therefore, the present examples and embodiments are to be considered as illustrative and not restrictive and the invention is not to be limited to the details given herein, but may be modified within the scope and equivalence of the appended claims.

What is claimed is:

1. A drive force distribution device of a vehicle including a main drive wheel, a sub drive wheel, and a drive force transmission system that transmits a drive force generated by a drive source to the drive wheels, the device comprising:
   a coupling arranged in the drive force transmission system, wherein the coupling changes a torque transmission rate of a torque transmitted from an input of the coupling to an output of the coupling, thereby varying a drive force distribution ratio between the main drive wheel and the sub drive wheel; and
   a control section that controls operation of the coupling, the control section estimating a temperature of at least one of heat generating portions of the drive force transmission system by calculating a value related to the heat energy accumulated in the at least one of the heat generating portions during torque transmission through the heat generating portion in correspondence with a rotational speed of the at least one of the heat generating portions and the torque transmission rate in the at least one of the heat generating portions, and correcting the calculated value by a correction value related to an outside temperature, wherein, if the estimated temperature exceeds a predetermined temperature, the control section controls the operation of the coupling to suppress overheating of the heat generating portion.

2. The device according to claim 1, wherein:
   the heat generating portions include at least one of a differential and a transfer case, the differential being arranged between the coupling and the sub drive wheel, the transfer case being provided between the drive source and the coupling and between the drive source and the main drive wheel; and the control section controls the operation of the coupling to decrease the torque transmission rate if the estimated temperature exceeds the predetermined temperature.

3. The device according to claim 1, wherein:
   the heat generating portions include the coupling; and if the estimated temperature of the coupling exceeds the predetermined temperature, the control section controls the operation of the coupling to decrease at least one of a differential rotational speed between the input and the output and the torque transmission rate.

4. The device according to claim 3, wherein:
   if the estimated temperature of the coupling exceeds the predetermined temperature, the control section controls the operation of the coupling to maximize the torque transmission rate.

5. A method for distributing drive force of a vehicle including a main drive wheel, a sub drive wheel, and a drive force transmission system that transmits a drive force generated by a drive source to the drive wheels, the method comprising:
   controlling operation of a coupling arranged in the drive force transmission system to vary a drive force distribution ratio between the main drive wheel and the sub drive wheel by changing a torque transmission rate of a torque transmitted from an input of the coupling to an output of the coupling;
   estimating a temperature of at least one of heat generating portions of the drive force transmission system by calculating a value related to the heat energy accumulated in the at least one of the heat generating portions during torque transmission through the heat generating portion in correspondence with the rotational speed of the at least one of the heat generating portions and the torque transmission rate in the at least one of the heat generating portions, and correcting the calculated value by a correction value related to an outside temperature;
   determining whether the estimated temperature of at least one of the heat generating portions exceeds a corresponding predetermined temperature; and
   controlling the operation of the coupling to suppress overheating of the corresponding heat generating portion if the estimated temperature exceeds the predetermined temperature.

6. The method according to claim 5, further comprising:
   estimating a temperature of at least one of a differential and a transfer case as the heat generating portion, the differential being arranged between the coupling and the sub drive wheel, the transfer case being provided between the drive source and the coupling and between the drive source and the main drive wheel; and
   controlling the operation of the coupling to decrease the torque transmission rate if the estimated temperature exceeds the predetermined temperature.

7. The method according to claim 5, further comprising:
   estimating the temperature of the coupling as the heat generating portion; and
   controlling the operation of the coupling to decrease at least one of a differential rotational speed between the input and the output and the torque transmission rate if the estimated temperature exceeds the predetermined temperature of the coupling.

8. The method according to claim 7, further comprising:
   controlling the operation of the coupling to maximize the torque transmission rate if the estimated temperature of the coupling exceeds the predetermined temperature.

9. A drive force distribution device of a vehicle including a main drive wheel, a sub drive wheel, and a drive force transmission system that transmits a drive force generated by a drive source to the drive wheels, the device comprising:
   a coupling arranged in the drive force transmission system, wherein the coupling changes a torque transmission rate of a torque transmitted from an input of the coupling to an output of the coupling, thereby varying a drive force distribution ratio between the main drive wheel and the sub drive wheel; and a control section that controls operation of the coupling, the control section estimating a temperature of at least one of heat generating portions of the drive force transmission system in correspondence with a rotational speed of the heat generating portion, the torque transmission rate, and an outside temperature, wherein, is the estimated temperature exceeds a predetermined temperature, the control section controls the operation of the coupling to suppress overheating of the heat generating portion, and wherein the heat generating portions include the coupling;

if the estimated temperature of the coupling exceeds the predetermined temperature and an estimated temperature of at least one of the heat generating portions other than the coupling exceeds a respective predetermined temperature, the control section controls the operation of the coupling to minimize the torque transmission rate.

10. A method for distributing drive force of a vehicle including a main drive wheel, a sub drive wheel, and a drive force transmission system that transmits a drive force generated by a drive source to the drive wheels, the method comprising:

controlling operation of a coupling arranged in the drive force transmission system to vary a drive force distribution ratio between the main drive wheel and the sub drive wheel by changing a torque transmission rate of a torque transmitted from an input of the coupling to an output of the coupling;

estimating a temperature of at least one of heat generating portions of the drive force transmission system in correspondence with the rotational speed of the heat generating portion, the torque transmission rate, and an outside temperature;

determining whether the estimated temperature of at least one of the heat generating portions exceeds a corresponding predetermined temperature;

controlling the operation of the coupling to suppress overheating of the corresponding heat generating portion if the estimated temperature exceeds the predetermined temperature; and estimating the temperature of the coupling as the heat generating portion;

controlling the operation of the coupling to minimize the torque transmission rate if the estimated temperature of the coupling exceeds the predetermined temperature and an estimated temperature of at least one of the heat generating portions other than the coupling exceeds a respective predetermined temperature.

* * * * *